US 9,272,570 B2

(12) United States Patent
Cahill (10) Patent No.: US 9,272,570 B2
(45) Date of Patent: Mar. 1, 2016

(54) INTEGRAL CLAMP HUBCAP FOR WHEEL SYSTEM AND APPARATUS (71) Applicant: Goodrich Corporation, Charlotte, NC (US)

(72) Inventor: Eric Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 315 days.

(21) Appl. No.: 13/952,146

(22) Filed: Jul. 26, 2013

(65) Prior Publication Data

US 2015/0028661 A1 Jan. 29, 2015

(51) Int. Cl.
*B60B 7/00* (2006.01)
*B60B 7/10* (2006.01)
*B60B 7/04* (2006.01)
*B60B 7/06* (2006.01)
*B64C 25/36* (2006.01)

(52) U.S. Cl.
CPC .............. *B60B 7/10* (2013.01); *B60B 7/0013* (2013.01); *B60B 7/04* (2013.01); *B60B 7/063* (2013.01); *B64C 25/36* (2013.01)

(58) Field of Classification Search
CPC ........ B60B 7/00; B60B 7/0013; B60B 7/061; B60B 7/066; B60B 7/12
USPC .................. 301/37.101, 37.102, 37.31, 108.1
See application file for complete search history.

(56) References Cited

U.S. PATENT DOCUMENTS

| 1,889,070 | A | * | 11/1932 | Hyatt | 301/108.1 |
| 2,460,784 | A | | 2/1949 | Albert | |
| 2,601,017 | A | | 6/1952 | Herrick | |
| 2,601,209 | A | | 6/1952 | Albert | |
| 2,695,195 | A | | 11/1954 | O'day | |
| 3,883,181 | A | * | 5/1975 | Dissinger | 301/37.42 |
| 4,116,490 | A | | 9/1978 | Huff et al. | |
| 7,438,367 | B2 | * | 10/2008 | Allsop | 301/108.1 |
| 9,039,101 | B1 | * | 5/2015 | Danto | 301/37.102 |
| 2006/0208560 | A1 | | 9/2006 | Allsop | 301/108.1 |
| 2007/0290548 | A1 | * | 12/2007 | Lundy | 301/37.24 |
| 2013/0334869 | A1 | * | 12/2013 | Kronemeyer et al. | 301/37.102 |

FOREIGN PATENT DOCUMENTS

FR          61026       3/1955
FR        2979581       3/2013

OTHER PUBLICATIONS

Extended European Search Report dated Mar. 23, 2015 in European Application No. 14170781.0.

* cited by examiner

*Primary Examiner* — John Walters
*Assistant Examiner* — James Triggs
(74) *Attorney, Agent, or Firm* — Snell & Wilmer L.L.P.

(57) ABSTRACT

A clamp-hubcap assembly is provided. The assembly may include a clamp, a hubcap, and a retaining device. The retaining device may be any suitable structure capable of coupling the clamp and the hubcap together.

18 Claims, 7 Drawing Sheets

INTEGRAL CLAMP HUBCAP FOR WHEEL SYSTEM AND APPARATUS

FIELD

The present disclosure relates to wheel hubcaps and, more specifically, to an integral clamp hubcap for retention of the hubcap on a wheel.

BACKGROUND

Aircraft wheels may include a hubcap that is retained on the wheel with a retaining device such as a clamp. During maintenance operations the hubcap and retaining device may be removed to service and/or to remove the wheel. When removed, the hubcap and retaining device may be separate pieces that may be misplaced, increasing the risk of foreign object damage ("FOD") and/or requiring replacement after loss.

SUMMARY

A hubcap assembly is provided herein that may comprise a hubcap, a clamp and a retaining device. The retaining device may be configured to connect the hubcap and the clamp.

In various embodiments, a wheel assembly may comprise an aircraft wheel, a hubcap, a clamp, and a retaining device. The hubcap may be installable on the aircraft wheel. The clamp may be configured to engage the wheel and the hubcap. The retaining device may be fixedly attached to the hubcap and the clamp.

In various embodiments, a clamp assembly comprises a clamp and a retaining device. The retaining device may be attached to the clamp. The retaining device may also be configured to couple to a hubcap.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step.

Surface shading lines may be used throughout the figures to denote different parts but not necessarily to denote the same or different materials.

Vehicles that comprise wheels often include hubcaps that protect internal rotating components in the wheel, such as for example, bearings, bushings, and/or the like. The hubcap may be retained by a clamp that ties, couples and/or otherwise clamps the hubcap to the wheel. The hubcap and clamp may be removed to perform maintenance operations and/or the like. During these maintenance operations the clamp and/or hubcap are removed and place aside (e.g., set on the ground so that a technician may access the wheel or other structures to conduct the maintenance operation).

In various embodiments, the clamp may be any suitable structure, shape, and/or configuration suitable for retaining a hubcap on a wheel. For example, the clamp may be a v-clamp (e.g., a clamp having a substantially "v" shaped portion), a u-clamp (e.g., a clamp having a substantially "u" shaped portion), an o-clamp, a u-bolt (e.g., a bolt having a substantially "u" shaped portion), a band clamp, an asymmetric clamp, and/or the like.

The retaining devices described herein provide cost effective, reliable, and efficient mechanisms for creating hubcap/clamp assemblies. In various embodiments, the clamp and hubcap may be coupled or fixed together to form an assembly. In this regard, the assembly is less likely to be lost or displaced (e.g., kicked) during a maintenance operation, which reduces the risk of FOD in an aircraft operating environment. The assembly may be provided as a single line-replaceable unit ("LRU"), as opposed to multiple LRUs (e.g., for the clamp and hubcap, separately).

Figure 1:
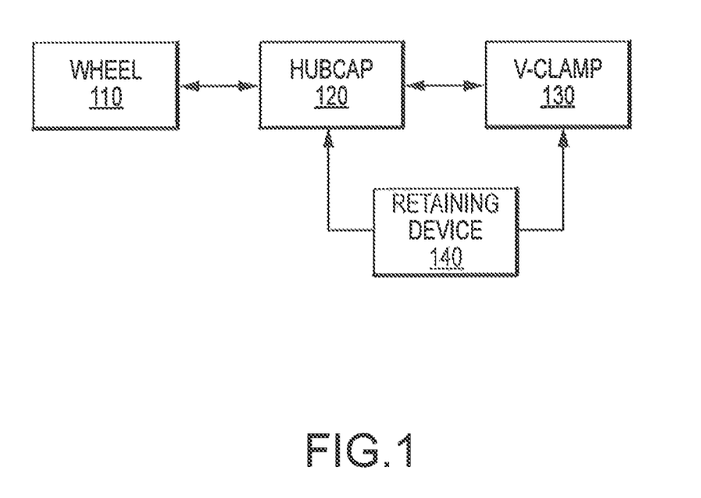
FIG. 1 is a block diagram that illustrates exemplary elements of a clamp-hubcap assembly, in accordance with various embodiments.

In various embodiments and with reference to FIG. 1, a vehicle such as an aircraft may comprise landing gear or a drive train with a wheel 110 and a hubcap 120. Hubcap 120 may be installable on wheel 110. Hubcap 120 may be retained and/or secured to wheel 110 with a clamp 130. Hubcap 120 and clamp 130 may be coupled to one another by a retaining device 140.

In various embodiments, retaining device 140 may be any suitable structure that is capable of coupling, attached, securing and/or otherwise joining hubcap 120 and clamp 130. For example, retaining device 140 may be a tab, a cable, a bond (e.g., a weld, a braze, an adhesive, and/or the like), a fastener (e.g., a screw, rivet, pin, and/or the like), and/or a bracket.

Figure 2A:
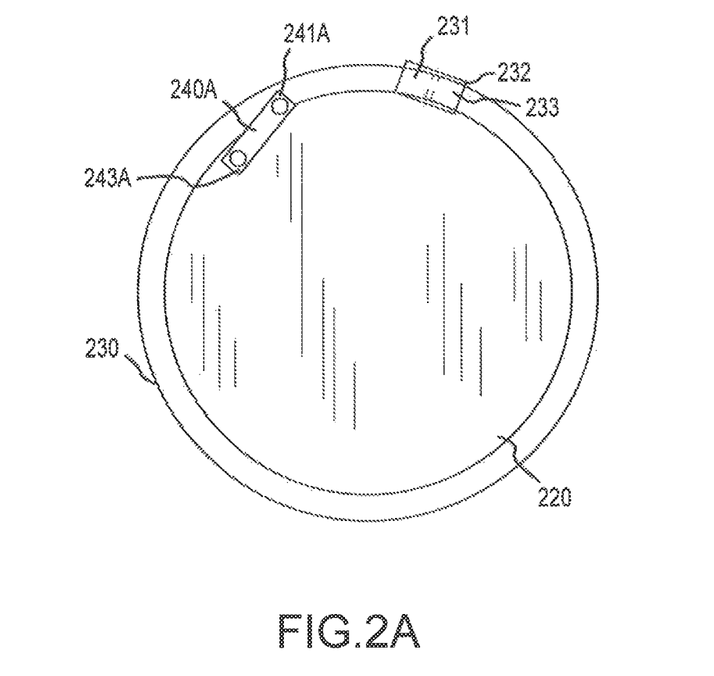
FIGS. 2A-2C illustrate profile views of clamp-hubcap assemblies, in accordance with various embodiments.

In various embodiments and with reference to FIG. 2A, clamp 230 may have a generally circular shape. Clamp 230 may have free ends (e.g., a first free end 231 and a second free end 233) that couple to one another when installed on wheel 110, as shown in FIG. 1, and/or hubcap 220. Free ends 231 and 233 may be coupled and/or held together with a coupling mechanism 232. For example, first free end 231 may comprise a bolt and second free end 233 may receive a nut (e.g., coupling mechanism 232 comprises a bolt and a nut). In this regard the bolt may be coupled to the nut to secure first free end 231 to the second free end 233, and similarly, secure and/or couple hubcap 220 to a wheel.

Figure 2B:
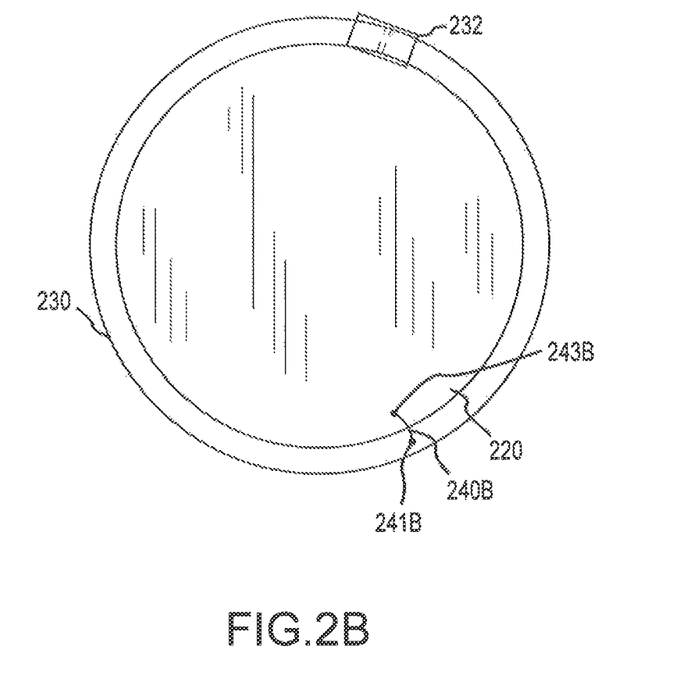
Figure 2C:
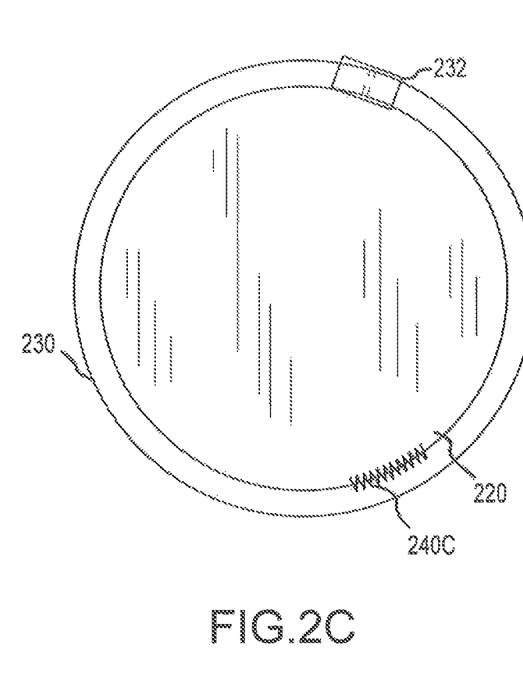

In various embodiments shown in FIGS. 2A-2C, a retaining mechanism, such as retaining mechanisms 240A through 240C may affix and/or fixedly attach clamp 230 to hubcap 220. In this regard, retaining mechanisms 240A through 240C may be fixedly attached to both clamp 230 and hubcap 220, but may allow movement between clamp 230 and hubcap 220 (e.g., where the retaining device is a wire or cable). Retaining mechanisms 240A through 240C may be installed at any suitable location of clamp 230 and/or hubcap 220. In this regard, retaining mechanisms 240A through 240C may be installed along a portion of the generally circular diameter such that free ends 231 and 233 are able to move sufficiently to surround the wheel diameter when the clamp 230/hubcap 220 assembly is installed on the wheel.

In various embodiments and with continued reference to FIG. 2A, the retaining device may be a tab 240A. Tab 240A may comprise a first end 241A and a second end 243A. The first end 241A may be attached to clamp 230 and the second end 243A may be attached to hubcap 220. For example, the first end 241A may be attached with a fastener or bond. Similarly, the second end 243A may be attached with a fastener or bond.

In various embodiments and with reference to FIG. 2B, the retaining device may comprise cable 240B (e.g., a wire, cord and/or the like). Cable 240B may comprise a first end 241B and a second end 243B. The first end 241B may be attached to clamp 230 and the second end 243B may be attached to hubcap 220. For example, the first end 241B may be attached with a fastener or bond. Similarly, the second end 243B may be attached with a fastener or bond. Cable 240B may be any suitable materials such as for example, a metal (e.g., aluminum, steel, titanium, and/or any other suitable metal or alloy), a polymer (e.g., nylon), a composite, and/or any other suitable material.

In various embodiments and with reference to FIG. 2C, the retaining device may be a bond 240C. Bond 240C may be a weld, braze, adhesive and/or the like bonding hubcap 220 to clamp 230. Moreover, bond 240C may couple and/or attach hubcap 220 to at least a portion of clamp 230.

Figure 3A:
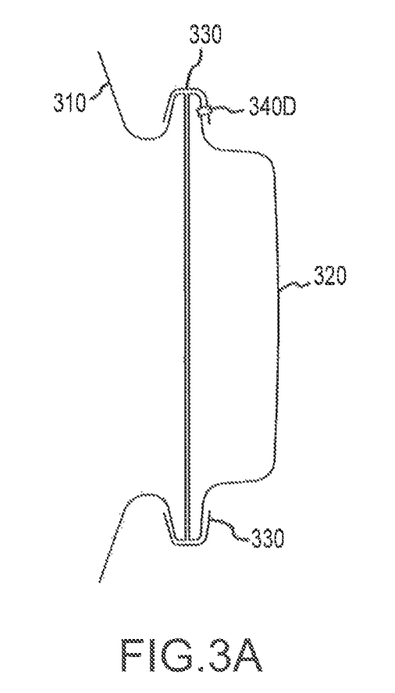
FIGS. 3A-3B illustrate partial cross-sectional views of a portion of a clamp-hubcap assembly installed on a wheel, in accordance with various embodiments.

In various embodiments and with reference to FIG. 3A, the retaining device may be a fastener 340D. Fastener 340D may be screw, rivet, pin, and/or the like. For example, fastener 340D may be configured to pass through a portion (such as an opening) of clamp 330 and engage hubcap 320. Similarly, fastener 340D may be configured to pass through a portion of hubcap 320 and engage clamp 330. In this regard, fastener 340D may attach or rigidly couple clamp 330 and hubcap 320 together such that they assembly is installable on wheel 310.

Figure 3B:
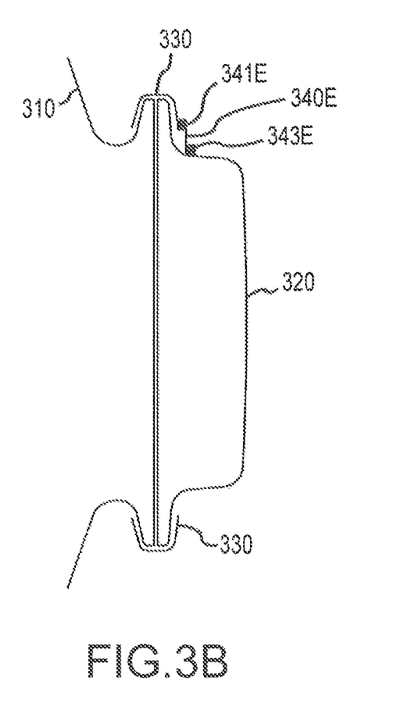

In various embodiments and with reference to FIG. 3B, the retaining device may be a bracket 340E. Bracket 340E may comprise a first end 341E and a second end 343E. The first end 341E may be attached to clamp 330 and the second end 343E may be attached to hubcap 320. For example, the first end 341E may be attached with a fastener or bond. Similarly, the second end 343E may be attached with a fastener or bond.

Figure 4A:
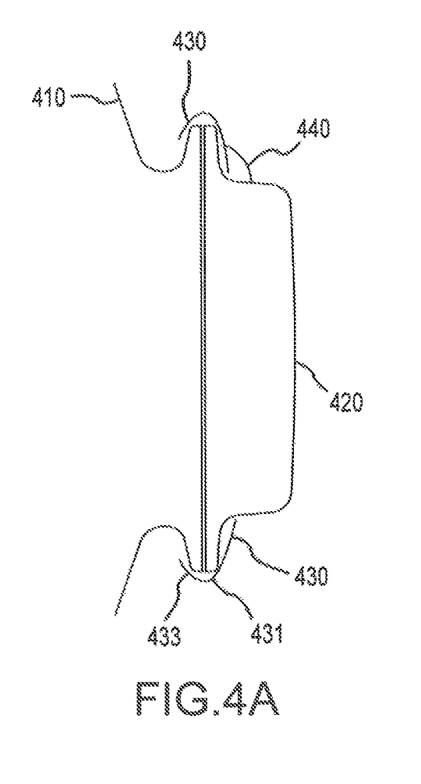
FIGS. 4A-4B illustrate partial cross-sectional views of a portion of a clamp hubcap assembly installed on a wheel, in accordance with various embodiments.
Figure 4B:
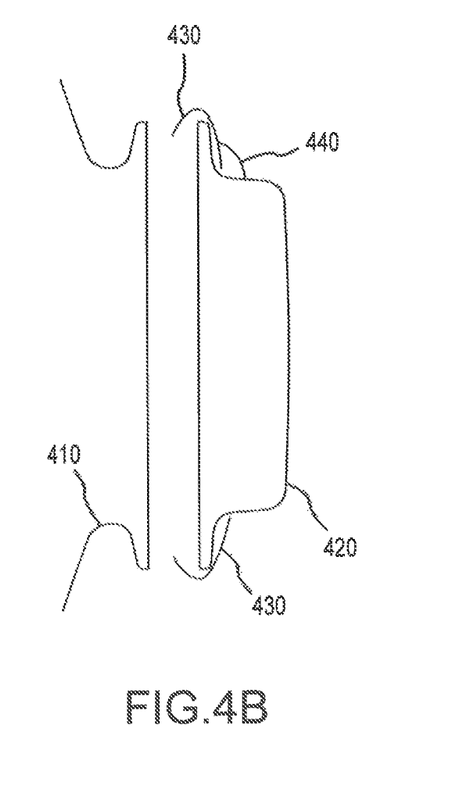

In various embodiments and with reference to FIGS. 4A-4B, clamp 430 may be any suitable shape or geometry. For example, clamp 430 may be asymmetric and/or may have a non-uniform or un-equal profile. In this regard, a first portion 431 of clamp 430 may be larger than a second portion 433 of clamp 430. First portion 431 may be coupled to or fixed to hubcap 420. Second portion 433 may be installable on wheel 410. Moreover, second portion 433 may be sized to be easily installed on wheel 410 and then tightened to secure hubcap 420 to wheel 410. Moreover, clamp 430 (e.g., first portion 431) may be coupled to hubcap 420 by retaining device 440 (e.g., a tab, a cable, a bond (e.g., a weld, a braze, an adhesive, and/or the like), a fastener (e.g., a screw, rivet, pin, and/or the like), and/or a bracket as described herein).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a nonexclusive inclusion, such that a process, method, article, or apparatus that comprises a list of elements does not include only those elements but may include other elements not expressly listed or inherent to such process, method, article, or apparatus.

What is claimed is:

1. A hubcap assembly, comprising:
   a hubcap;
   a clamp configured to retain the hubcap to a wheel, the wheel having a wheel circumference,
      wherein the clamp has a generally circular clamp circumference conforming to the wheel circumference, the clamp further having a first free end and a second free end, wherein the first free end is configured to couple to the second free end in order to secure the hubcap to the wheel; and a retaining device comprising a first retaining end and a second retaining end, the first retaining end coupled to the clamp and the second retaining end coupled to the hubcap, wherein the retaining device couples the clamp to the hubcap to retain the hubcap to the clamp in response to removal of the hubcap from the wheel, wherein the retaining device installed along a portion of the clamp circumference such that the first free end and second free end are able to move to enable the clamp to surround the wheel circumference in response to installation of the hubcap to the wheel.

2. The hubcap assembly of claim 1, wherein the wheel is an aircraft wheel.

3. The hubcap assembly of claim 1, wherein the retaining device is a fastener, wherein the retaining device rigidly couples the clamp and hubcap together.

4. The hubcap assembly of claim 3, wherein the fastener is at least one of a screw, a pin, and a rivet, wherein the retaining device rigidly couples the clamp and hubcap together.

5. The hubcap assembly of claim 1, wherein the retaining device is at least one of a bracket and a tab.

6. The hubcap assembly of claim 1, wherein the retaining device is a bond.

7. The hubcap assembly of claim 6, wherein the bond is at least one of a weld, a braze, and an adhesive.

8. The hubcap assembly of claim 1, wherein the retaining device allows movement between the clamp and the hubcap, and wherein the retaining device is at least one of a cable, a wire, and a cord.

9. A wheel assembly, comprising: an aircraft wheel; a hubcap installable on the aircraft wheel; a clamp configured to engage the wheel and the hubcap and to disengage from the wheel and the hubcap upon removal of the hubcap from the wheel; and a retaining device fixedly attached to the hubcap and the clamp, wherein the retaining device couples the clamp to the hubcap to retain the hubcap to the clamp in response to removal of the hubcap from the hubcap from the wheel, wherein the clamp has a generally circular clamp circumference conforming to a circumference of the aircraft wheel, the clamp further having a first free end and a second free end, wherein the first free end is configured to couple to the second free end in order to secure the hubcap to the wheel, wherein the retaining device comprises a first retaining end and a second retaining end, wherein the first retaining end is fixed to the clamp along a portion of the clamp circumference, and the second retaining end is fixed to the hubcap, such that the first free end and second free end are able to move to enable the clamp to surround the wheel circumference upon installation of the hubcap to the wheel.

10. The wheel assembly of claim 9, wherein the retaining device is at least one of a bracket, a tab, a cable, a cord, and a wire.

11. The wheel assembly of claim 9, wherein the retaining device is a bond.

12. The wheel assembly of claim 11, wherein the bond is at least one of a weld, a braze, and an adhesive.

13. The wheel assembly of claim 9, wherein the retaining device is a fastener.

14. The wheel assembly of claim 13, wherein the fastener is at least one of a screw, a pin, and a rivet.

15. The wheel assembly of claim 13, wherein the fastener is configured to pass through the clamp and engage the hubcap, and rigidly couples the clamp and hubcap together.

16. A clamp assembly, comprising: a clamp; and a retaining device fixedly attached to the clamp, wherein the retaining device is fixedly attached to a hubcap, wherein the retaining device prevents separation of the hubcap from the clamp wherein the clamp is configured to retain the hubcap with an aircraft wheel, wherein the clamp has a generally circular clamp circumference conforming to a circumference of the aircraft wheel, the clamp further having a first free end and a second free end, wherein the first free end is configured to couple to the second free end in order to secure the hubcap to the aircraft wheel, wherein the retaining device comprises a first retaining end and a second retaining end, wherein the first retaining end is fixed to the clamp along a portion of the clamp circumference, and wherein the second retaining end is fixed to the hubcap, such that the first free end and second free end are able to move to enable the clamp to surround the circumference of the aircraft wheel upon installation of the hubcap to the aircraft wheel.

17. The clamp assembly of claim 16, wherein retaining device is at least one of a tab, a bracket, a fastener, a cable, a wire, and a cord.

18. The clamp assembly of claim 16, wherein the retaining device is configured to pass through the clamp and engage the hubcap.

* * * * *